Aug. 16, 1932.  J. VAN VORST  1,871,828
TRAILER
Filed May 15, 1930   2 Sheets-Sheet 2
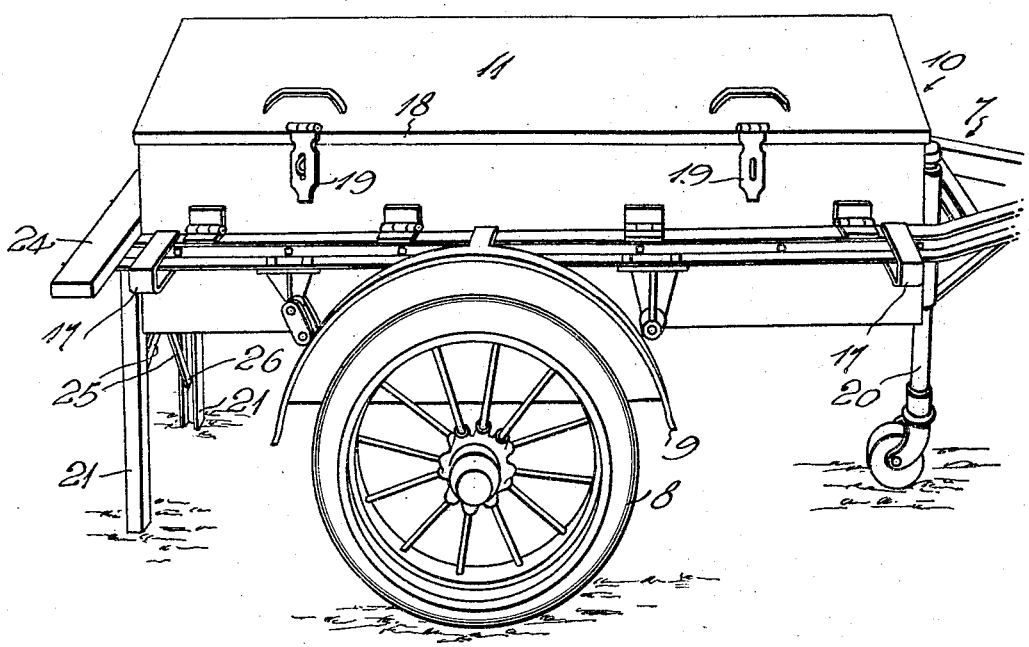
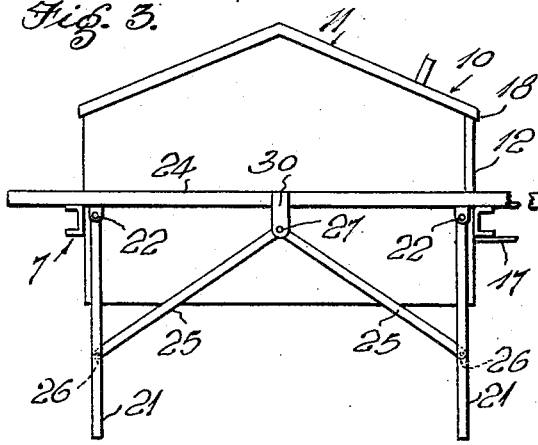
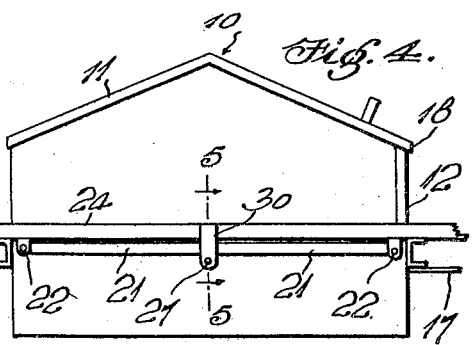
Inventor
John Van Vorst
By H. R. Willson & Co.
Attorneys
Witness
H. Woodard Patented Aug. 16, 1932

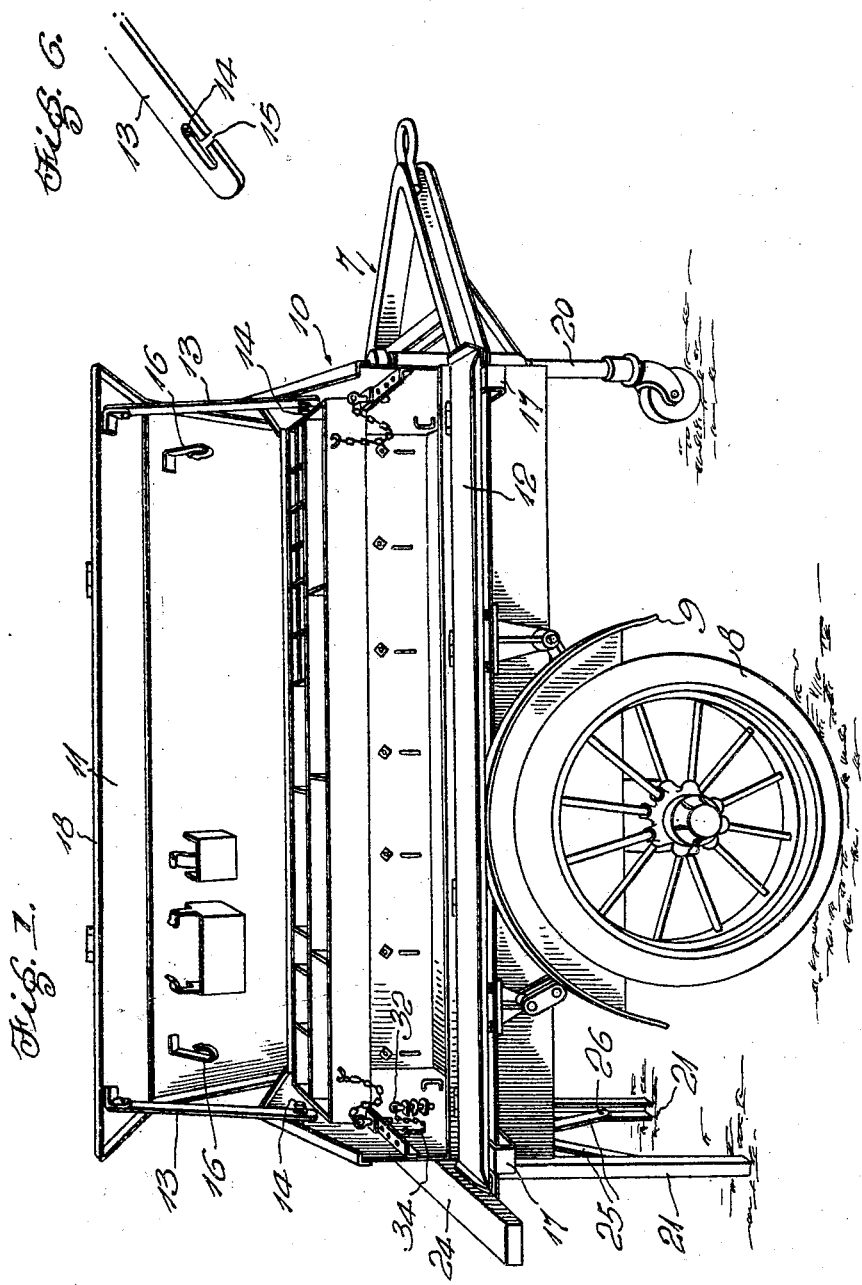

1,871,828

UNITED STATES PATENT OFFICE

JOHN VAN VORST, OF SCHENECTADY, NEW YORK, ASSIGNOR TO MOHAWK ASPHALT HEATER COMPANY, OF SCHENECTADY, NEW YORK, A COPARTNERSHIP CONSISTING OF JOHN VAN VORST AND GEORGE M. BAKER

TRAILER

Application filed May 15, 1930. Serial No. 452,773.

The invention relates to improvements in trailers adapted for use by linemen and others for carrying tools and equipment from place to place, and the principal object of said invention, is the provision of a novel leg structure which may be folded when the trailer is being towed, and may be lowered when said trailer is to be left standing, either while working or over night.

The trailer body is formed by a casing having an upwardly swingable top and an outwardly and downwardly swingable side wall, and a further object of the invention is to make unique provision for holding this side wall in a horizontal position so that it may be conveniently used as a work-bench.

A still further aim is the provision of novel means for holding the casing top raised and preventing accidental closing of said top.

With the foregoing in view, the invention resides in the novel subject matter hereinafter described and claimed, description being accomplished by reference to the accompanying drawings.

Fig. 1 is a perspective view of a trailer constructed in accordance with the invention, showing the casing top raised, the side wall lowered to horizontal position and the supporting legs in operative position.

Fig. 2 is a view similar to Fig. 1 but showing the top and the side wall in closed position.

Fig. 3 is an end elevation as indicated by the arrow 3 of Fig. 2.

Fig. 4 is a similar view showing the legs supported in raised position.

Fig. 5 is a detail vertical sectional view on line 5—5 of Fig. 4.

Fig. 6 is a detail view illustrating one of the top-supporting links and the stud with which it co-acts.

A chassis frame 7 is shown supported by wheels 8 and provided with fenders 9 for said wheels, said frame carrying a trailer body in the form of a metallic casing 10. This casing is provided with an upwardly swingable hinged top 11 and with an outwardly and downwardly swingable side wall 12, and when they are both opened as seen in Fig. 1, easy access is had to the entire interior of the casing. For holding the top 11 raised, links 13 are pivoted thereto at their upper ends, and headed studs 14 are secured to the casing ends for reception in T-shaped slots 15 in the lower ends of said links. When these links are in operative position as in Fig. 1, they are inclined, and the slots 15 open through the edges of said links which are then their lower edges. Consequently, when these slots are engaged with the studs 14, there is little likelihood of the links being accidentally disengaged from said studs if struck with tools or in other ways, for the links must first be positioned so that the studs may pass through the open ends of the slots, before said links can be disengaged from said studs. Spring clips 16 are preferably carried by the cover 11 to support the links when said cover is to be closed.

When the side wall 12 is swung outwardly and downwardly to horizontal position, its intermediate portion rests upon one of the fenders 9 and hence is solidly supported, and rigid brackets 17 project laterally from the casing to underlie and support the ends of said side wall 12, thus allowing the latter to be effectively used as a work-bench. When the side wall 12 is raised, a flange 18 on the cover 11 holds it closed, and hasps or the like 19 are provided to then permit locking of the cover and the side wall together.

A front leg 20 which may be raised or lowered as required, is provided at the front end of the casing 10 and at the rear end of this casing, two channel-shaped legs 21 are provided. The upper ends of the legs 21 are pivoted to lugs 22 projecting downwardly from a transverse horizontal bar 24 which is secured upon the rear end of the chassis frame 7 and lies against the rear end wall of the casing 10, said bar 24 being adapted for supporting a vise, a pipe clamp, etc.

The legs 21 are pivoted to the bar 24 near the ends of the latter, and when said legs are not needed, they are foldable upwardly and inwardly into overlapped relation under said bar 24, as seen in Fig. 4. Novel provision is made whereby the legs may be supported in either raised or lowered position. Inclined braces 25 are pivoted at their lower ends to the legs 21 as denoted at 26, the upper ends of said braces being provided with openings through which a pin 27 is insertible. This pin is receivable in an opening 28 in the rear end of the casing 10 and in an opening 29 in a lug 30 which projects downwardly from the center of the bar 24. When the pin 27 is passed through the openings 28 and 29 and through the openings in the upper ends of the braces 25, the legs 21 are effectively held in lowered positions. When the legs 21 are swung upwardly into the position shown in Figs. 4 and 5, the braces 25 nest in the channels of said legs and the latter may then rest upon the pin 27 as shown in Figs. 4 and 5.

Pin 27 is outwardly insertible through the openings 28 and 29 and the inner end of said pin is provided with an eye 31. Through this eye, a locking pin 32 is insertible, said locking pin being engageable with apertured lugs 33 projecting inwardly from the rear end wall of the casing 10, as seen in Figs. 1 and 5. Preferably a chain 34 is provided to prevent loss of the pin 32.

Whether the legs 21 be raised or lowered, if the cover 11 be locked closed, the positions of said legs cannot be changed by unauthorized persons. As soon as the cover is unlocked and raised however, access may be had to the locking pin 32, the latter may be removed, and the pin 27 then withdrawn to either raise or lower the legs 21, as required.

When the legs 21 are held in raised position, the trailer may be readily towed without any possibility of injuring said legs, and when the trailer is left standing with the legs lowered, there is no possibility of the trailer tilting and possibly drifting and causing accidents, and moreover, it cannot be easily moved from one place to another by mischievous youngsters.

I claim:

1. In a trailer embodying a wheeled body; an upwardly swingable leg pivoted to said body, an inclined brace pivoted at its lower end to said leg, and a removable pin insertible through the upper end of said brace, said body being provided with means for removably receiving said pin, said means being spaced from the leg pivot a distance less than the length of the leg, whereby said leg may be supported by said pin when swung upwardly after disengagement of said brace from said pin.

2. In a trailer embodying a wheeled body, a transverse horizontal bar secured across one end of said body, two legs pivoted to the ends of said bar and adapted to swing upwardly and inwardly into overlapped relation under said bar, inclined braces pivoted at their lower ends to said legs and having openings in their upper ends, said bar having a portion formed with an opening for alinement with said brace openings, and a removable pin insertible through said openings, to connect the braces with the bar, said pin being also adapted to support said legs in upwardly swung position.

3. A structure as specified in claim 1; together with means releasable only from the interior of said body for holding said pin in operative position, said body being in the form of a casing and having a lockable closure which when locked bars access to said pin-holding means.

4. A structure as specified in claim 2; said body having an opening alined with the opening of said bar and adapted to receive said pin, and means releasable only from the interior of said body for holding said pin in operative position, said body being in the form of a casing and having a lockable closure which when locked bars access to said pin-holding means.

5. In a trailer, a wheeled body, a pivoted leg for said body, and means projectable from the interior to the exterior of said body for holding said leg in either operative position or upwardly swung position, said body being in the form of a casing and having a lockable closure which when locked bars access to said leg-holding means.

6. In a trailer, a wheeled body, an upwardly and downwardly movable leg for said body, and means projectable from the interior to the exterior of said body for holding said leg in at least one position; said body being in the form of a casing and having a lockable closure which when locked bars access to said leg-holding means.

7. In a trailer, a wheeled body, an upwardly and downwardly movable leg for said body, means projectable from the interior to the exterior of said body for holding said leg in at least one position, and means releasable only from the interior of said body for holding the first-named means in an operative position; said body being in the form of a casing and having a lockable closure which when locked bars access to both of the aforesaid means.

In testimony whereof I affix my signature.

JOHN VAN VORST.